(12) United States Patent
Painter et al.

(10) Patent No.: US 11,080,090 B2
(45) Date of Patent: Aug. 3, 2021

(54) METHOD AND SYSTEM FOR SCALABLE JOB PROCESSING

(71) Applicant: IMPORT.IO LIMITED, London (GB)

(72) Inventors: Matthew James George Painter, London (GB); Ian Andrew Clark, London (GB)

(73) Assignee: IMPORT.IO LIMITED, London (GB)

(*) Notice: Subject to any disclaimer, the term of this patent is extended or adjusted under 35 U.S.C. 154(b) by 21 days.

(21) Appl. No.: 15/503,889

(22) PCT Filed: Aug. 14, 2015

(86) PCT No.: PCT/GB2015/052349
§ 371 (c)(1),
(2) Date: Feb. 14, 2017

(87) PCT Pub. No.: WO2016/024124
PCT Pub. Date: Feb. 18, 2016

(65) Prior Publication Data
US 2018/0349178 A1    Dec. 6, 2018

(30) Foreign Application Priority Data

Aug. 14, 2014    (GB) .................................... 1414463

(51) Int. Cl.
| G06F 9/46 | (2006.01) |
| G06F 9/48 | (2006.01) |
| G06F 9/50 | (2006.01) |
| G06F 9/54 | (2006.01) |

(52) U.S. Cl.
CPC ............ *G06F 9/4881* (2013.01); *G06F 9/485* (2013.01); *G06F 9/5083* (2013.01); *G06F 9/546* (2013.01)

(58) Field of Classification Search
CPC ...... F06F 9/4881; G06F 9/485; G06F 9/5083; G06F 9/546
USPC ......................................................... 718/106
See application file for complete search history.

(56) References Cited

U.S. PATENT DOCUMENTS

| 5,530,905 A | * | 6/1996 | Nichols ................... H04L 29/00 709/203 |
| 6,389,403 B1 | * | 5/2002 | Dorak, Jr. ............... G06F 21/10 705/51 |
| 7,475,002 B1 | * | 1/2009 | Mann ................... G06F 9/45558 703/21 |
| 8,539,492 B1 | | 9/2013 | Beckford et al. |

(Continued)

OTHER PUBLICATIONS

International Search Report for PCT/GB2015/052349 dated Mar. 1, 2016, 6 pages.

(Continued)

*Primary Examiner* — Camquy Truong
(74) *Attorney, Agent, or Firm* — Nixon & Vanderhye, P.C.

(57) ABSTRACT

The present invention relates to methods for processing jobs within a cluster architecture. One method comprises the pausing of a job when waiting upon external dependencies. Another method comprises the transmission of messages relating to the ongoing processing of jobs back to a client via a persistent messaging channel. Yet another method comprises determining capacity at a node before allocating a job for processing by the node or adding the job to a cluster queue. A system for processing jobs within a cluster architecture is also disclosed.

19 Claims, 17 Drawing Sheets

(56) References Cited

U.S. PATENT DOCUMENTS

| | | | | |
|---|---|---|---|---|
| 8,769,537 B1* | 7/2014 | Ruggiero | .................. | G06F 9/46 |
| | | | | 718/100 |
| 2005/0086030 A1* | 4/2005 | Zeidman | .................. | G06F 8/30 |
| | | | | 703/1 |
| 2007/0256058 A1* | 11/2007 | Marfatia | .................. | G06F 8/51 |
| | | | | 717/137 |
| 2010/0333091 A1* | 12/2010 | Lin | ....................... | G06F 9/4843 |
| | | | | 718/100 |
| 2013/0305258 A1 | 11/2013 | Durant | | |
| 2015/0154056 A1* | 6/2015 | Chen | .................... | G06F 9/5083 |
| | | | | 718/103 |
| 2015/0314454 A1* | 11/2015 | Breazeal | ................ | B25J 9/0003 |
| | | | | 700/259 |

OTHER PUBLICATIONS

Written Opinion of the ISA for PCT/GB2015/052349 dated Mar. 1, 2016, 12 pages.

* cited by examiner

Job Map

| Parent 502 | Child 503 |
|---|---|
| Job A | Job B |
| Job A | Job C |
| Job D | Job E |
| Job E | Job F |
|  |  |

Figure 5a

Message Registry

| Messaging ID 506 | Message 505 |
|---|---|
| AAA | Results from Job B |
| AAA | Results from Job C |
| AAA | Job A is complete |
| AAB | Job D has spawned new job E |
|  |  |

Figure 5b

METHOD AND SYSTEM FOR SCALABLE JOB PROCESSING

This application is the U.S. national phase of International Application No. PCT/GB2015/052349 filed Aug. 14, 2015 which designated the U.S. and claims priority to GB Patent Application No. 1414463.8 filed Aug. 14, 2014, the entire contents of each of which are hereby incorporated by reference.

FIELD OF INVENTION

The present invention is in the field of cluster processing. More particularly, but not exclusively, the present invention relates to processing jobs in a cluster architecture.

BACKGROUND

The Internet currently faces a major challenge of supporting millions of users demanding access to concurrent, responsive, robust and always available services. Currently the underlying Internet resources are under immense pressure from ever increasing number of concurrent sessions and hits per day to Internet sites which translates itself into an ever increasing number of I/O and network requests.

Leading websites, specialising in providing services which require performing large tasks with long processing times, usually receive millions of hits per day from millions of users. As the demand for such Internet services grows, as does their functionality, new system design techniques must be developed to manage and schedule this load efficiently.

As the number of Internet users continues to grow, load conditioning becomes a more important aspect of service design especially when managing long periods of time for processing of large tasks. The peak load on an Internet service may be more than an order of magnitude greater than its average load; in this case over-provisioning of resources is generally infeasible.

Internet services require sophisticated job processing and scheduling techniques to support high concurrency while being well-tailored to the dynamic load surges. Excessive commitment of resources or degradation must be avoided to prevent suffering by clients. These requirements mean that the asynchronous and concurrent processing of jobs over the Internet with a well-designed load conditioning strategy is becoming more and more necessary. This is a problem of unprecedented global scale. At present there is a global race to solve this problem more efficiently. Solving this problem presents immense value and benefit to both subscribers using the services and the businesses who provide those mass concurrent services over the Internet.

There are some notable existing solutions for this problem. Perhaps the most notable one is Staged Event Driven Architecture (SEDA) described within Matt Welsh, "The Staged Event-Driven Architecture for Highly-Concurrent Server Applications", Ph.D. Qualifying Examination Proposal, Computer Science Division, University of California, Berkeley. In this solution, use is made of a set of design patterns which break the control flow through an event-driven system into a series of stages separated by queues. Each stage represents some set of states in the monolithic event-driven design. The key difference to prior technology is that in SEDA each stage can now be considered an independent, contained entity with its own incoming event queue.

Tiago Salmito, Noemi Rodriguez, and Ana Lúcia de Moura, "Staged Concurrency in Lua Introducing Leda", Departamento de Informática Pontifícia Universidade Católica do Rio de Janeiro (PUC-Rio) Rua Marquês de SaVicente, 225—CEP 22.451-900—Rio de Janeiro—RJ—Brazil, describes the use of the scripting language Lua to build Leda, a system for distributed staged-based programming where the authors attempt to extend the benefits of SEDA to distributed environments.

Within the U.S. Pat. No. 7,467,390, the inventors present an "Enhanced Staged Event-Driven Architecture" which includes an event queue configured to enqueue events, an event handler programmed to process events in the process events in the event queue, and a thread pool coupled to the event handler. A resource manager further can be coupled to the thread pool and the event queue. Moreover, the resource manager can be programmed to allocate additional threads to the thread pool where the number of events en-queued in the event queue exceeds a threshold value and where all threads in the thread Pool are busy.

In the U.S. Pat. No. 8,347,291, the inventor presents enterprise scheduler for jobs performable on the remote system by receiving user specified values for retrieved job definitions comprising metadata representation of properties of jobs.

Systems and methods provided within the U.S. Pat. No. 8,429,448 aims at dynamic transaction migration in an event-driven multi-silo architecture.

Dong Liu and Ralph Deters, "The Reverse C10K Problem for Server-side Mashups" describes the so called problem of reverse C10K problem, or RC10K, i.e. how to support tens of thousands of simultaneous outbound HTTP requests running on a web server.

A variant of the reverse C10K problem exists for handling large numbers of job requests when those jobs require steps that take time to wait for externals actions to complete. If one thread is used to process the whole job whilst waiting for tasks with external dependencies to complete, a single node would soon not be able to process new requests and CPU work would not be efficiently utilised, even a cluster of such nodes would eventually blocked by these external dependencies.

Unfortunately, the prior art described herein suffers from several disadvantages when applied to solve this problem, namely:
 jobs that do not have a deterministic path would require continually passing between stages, potentially with multiple returns to the same stage. Consider rendering of a web page might require many calls to the download stage as new JavaScript scripts are evaluated; and
 jobs that require a lot of state, again consider a web page and the state of evaluated scripts and the page DOM, would be problematic when serializing to the event queue.

It is an object of the present invention to provide a jobs processing method and system within a distributed architecture which overcomes the disadvantages of the prior art, or at least provides a useful alternative.

SUMMARY OF INVENTION

According to a first aspect of the invention there is provided a method for processing jobs in a cluster architecture, including:
 one node of a plurality of processing nodes within the architecture receiving a job;
 processing the job until the job is waiting for an external dependency to complete;

when a job is waiting for an external dependency, pausing the job;

processing another job; and when the external dependency is completed, continuing the job.

Each job may be deserialised from a job definition. The job definition may include task parameters and definition type.

Continued jobs may be allocated to a local queue for the node.

When a job is paused, its state may be saved.

The external dependency may be a network input/output.

The external dependency may be information requested from an external Internet service.

The job may be received from another node of the plurality of nodes.

The job may be received from an external client.

According to a further aspect of the invention there is provided a method for processing jobs in a cluster architecture, including:

one node of a plurality of processing nodes within the architecture receiving a job from a client;

creating a messaging channel between the node and the client; and transmitting messages relating to the job via the messaging channel back to the client.

Each job may include a UUID.

A job may trigger creation of one or more child jobs. The one or more child jobs may transmit messages relating to the child jobs via the messaging channel to the client. The method may further including the step of storing a map of parent job-child jobs. The map may be replicated at all nodes processing the jobs.

If a node of a plurality of nodes receives a request to cancel a job from the client, the job UUID and/or all child job UUIDs may be broadcast to all nodes. If a node receives broadcasted cancelled job UUIDs, interrupting and cancelling any of those jobs currently executing.

Each job may include task parameters.

Messages resulting from jobs to the client may be stored within a message registry.

The message registry may be replicated at each node processing the job. Messages may be transmitted from the message registry to the client from the node to which the client is presently connected.

The messaging channel may be persistent.

The messages may include job status and results.

Each job may include a message channel identifier. The messages stored within the message registry may be associated with a message channel identifier. Each child job may have the same message channel identifier as their parent. Messages may be transmitted back to the client via the messaging channel from a job using the job's message channel identifier.

According to a further aspect of the invention there is provided a method for processing jobs in a cluster architecture, including:

one node of a plurality of processing nodes within the architecture receiving a job from a client;

the node determining capacity; and processing the job at the node if the capacity is below a threshold or adding the job to a cluster queue for processing by another node of the plurality of nodes.

Each node may also include a local queue, and the node may processes jobs within the local queue before jobs in the cluster queue.

The method may further including the step of the node determining capacity to process a job within the local queue and where capacity is not available pushing the job to the cluster queue.

Jobs may be processed at the node from the local queue when the jobs are flagged for local execution only.

Where a job creates new jobs, the new jobs may be added to the local queue.

Each node may comprise a plurality of worker threads, and wherein a job is allocated for processing by an available worker thread.

The capacity of node may include determining CPU utilisation.

The job may include task parameters.

The node may serialise the job before adding the job to the cluster queue.

The method may further include the step of another node of the plurality of nodes removing the cluster queued job, de-serialising the job definition, and processing the job.

In relation to all the above aspects, the job may include one or more thresholds.

The thresholds may include one or more from the set of CPU time, memory usages, and total time.

A job may cancel itself if a threshold is exceeded.

The node may adaptively controls the number of worker threads and/or the speed of dequeuing jobs from the cluster queue based upon analysis of capacity at the node.

The capacity of node may include projected utilisation/load of the node over time of processing jobs.

According to a further aspect of the invention there is provided a system comprising:

A plurality of processing nodes within a cluster architecture; and

A communications system;

wherein the system is configured for performing the method of any one of the above aspects.

Other aspects of the invention are described within the claims.

BRIEF DESCRIPTION OF THE DRAWINGS

Embodiments of the invention will now be described, by way of example only, with reference to the accompanying drawings in which:

FIG. 5a: shows a block diagram illustrating a job map in accordance with an embodiment of the invention;

FIG. 5b: shows a block diagram illustrating a message registry in accordance with an embodiment of the invention;

DETAILED DESCRIPTION OF PREFERRED EMBODIMENTS

The present invention provides a method and system for processing jobs within a cluster architecture.

The inventors have developed a scalable and efficient solution for a variant of the reverse C10K problem which progresses beyond existing solutions when the service involves processing large tasks by providing, in some embodiments, better scalable processing of jobs, better user/client experience, more efficient management of the Internet resources, lower degradation of services when demand for a service exceeds its capacity, and potential for better load conditioning.

Figure 1:
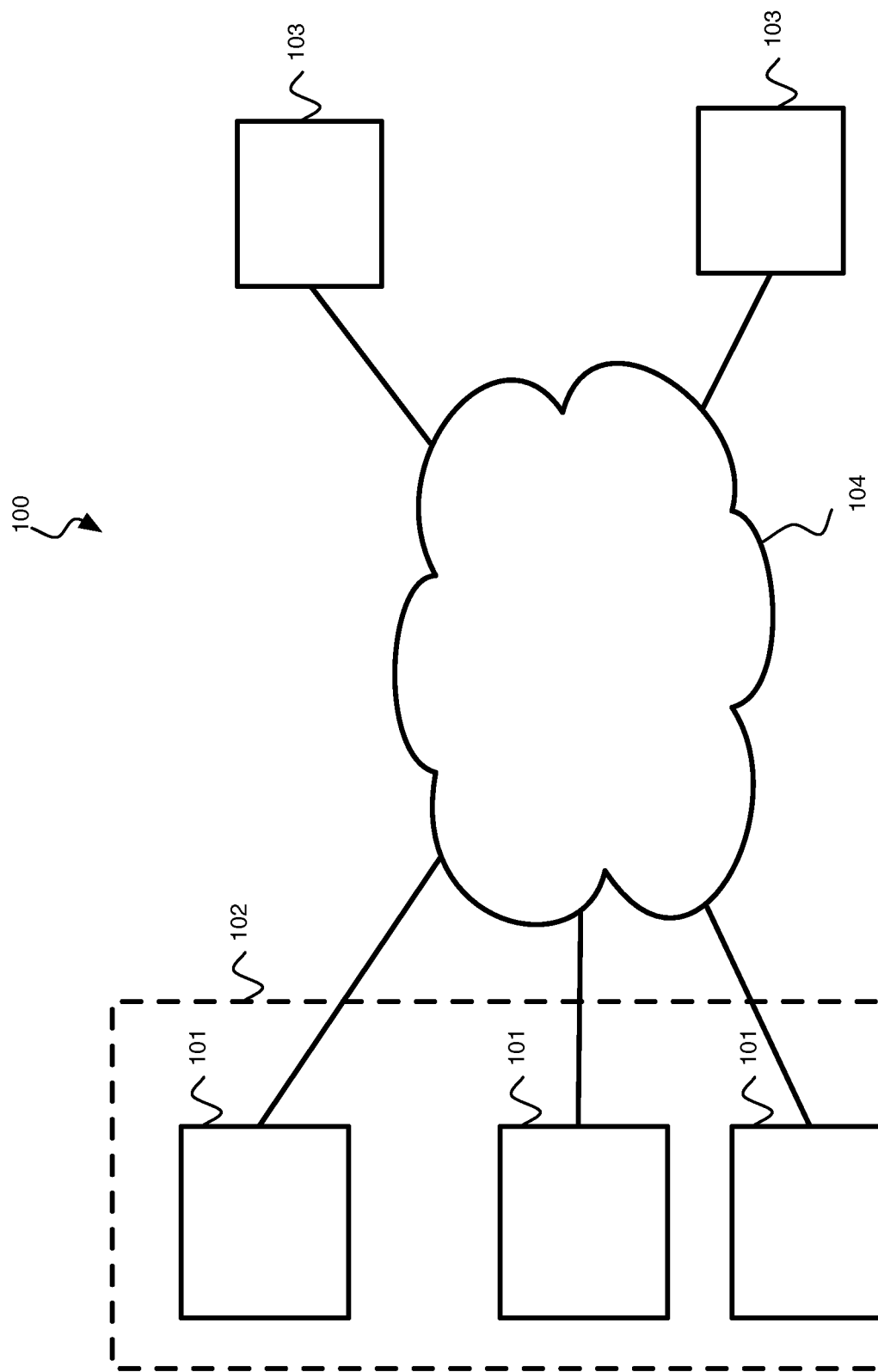
FIG. 1: shows a block diagram illustrating a system in accordance with an embodiment of the invention.

In FIG. 1, a system 100 in accordance with an embodiment of the invention is shown.

A plurality of processing nodes 101 within a cluster architecture 102 are shown. Within the cluster 102, the nodes 101 may share resources via a networking protocol.

The nodes 101 may be physical apparatus or virtual servers.

A plurality of clients 103 are also shown.

The clients 103 may be physical computing apparatus or virtual servers. The clients 103 may include a processor and communications module.

The clients 103 and nodes 101 may be interconnected via a communications system 104.

The communications system 104 may be a network. The communications system 104 may include a load balancer.

Each client 103 may be configured for making a request to process a job at the nodes 101. The job may comprise tasks. The tasks may be comprised of a series of sub-tasks. One or more of the tasks or sub-tasks may require the resolution of external dependencies to conclude the job. Each client 103 may further configured to receive and transmit messages from and to the nodes 101 via a persistent message channel. The messages may comprise metadata about jobs being processed by the nodes 101.

The system 100 may be configured for creating a persistent messaging channel between a node 101 and a job requesting client 103.

Each node 101 may be configured for receiving requests to process jobs from clients 103, for allocating the jobs for processing at the node 101 or across the plurality of nodes 101, for processing the jobs, and for delivering messages back to the client 103 in relation to the jobs via the persistent messaging channel.

The tasks may require the collection and/or collation of data from external data sources, such as Internet web servers, and the delivery of this collected and/or collate data back to the clients 103. The data may be delivered back to the clients 103 via the persistent messaging channel.

Each node 101 may comprise a plurality of workers or threads to enable simultaneous processing of jobs.

The nodes 101 may be configured for receiving jobs for processing from any other of the plurality of nodes 101.

The nodes 101 may be configured for allocating jobs for processing across the plurality of nodes 101 by adding the job to a cluster queue accessible by all of the nodes 101.

The nodes 101 may be configured for determining whether to process a job at the node or allocating the job to the cluster queue based upon capacity at the node.

Where the job comprises multiple tasks or sub-tasks, a node 101 may be configured to generate new children jobs to perform those tasks. The children jobs may be allocated by the node 101 to a local queue or to a cluster queue accessible by all nodes 101.

Where the task or sub-task of a job is waiting for an external dependency, the node 101 may be configured for pausing the job and then selecting a further job to process from the local or cluster queue.

An application program interface (API) may be provided by the cluster architecture 102 to the clients 103 to facilitate communication between the nodes 101 and the clients 103. The API may provide a persistent message channel configured to receive and transmit a plurality of messages from/to the client to/from the cluster architecture, at least some of the messages comprising metadata about a job being processed.

Figure 2:
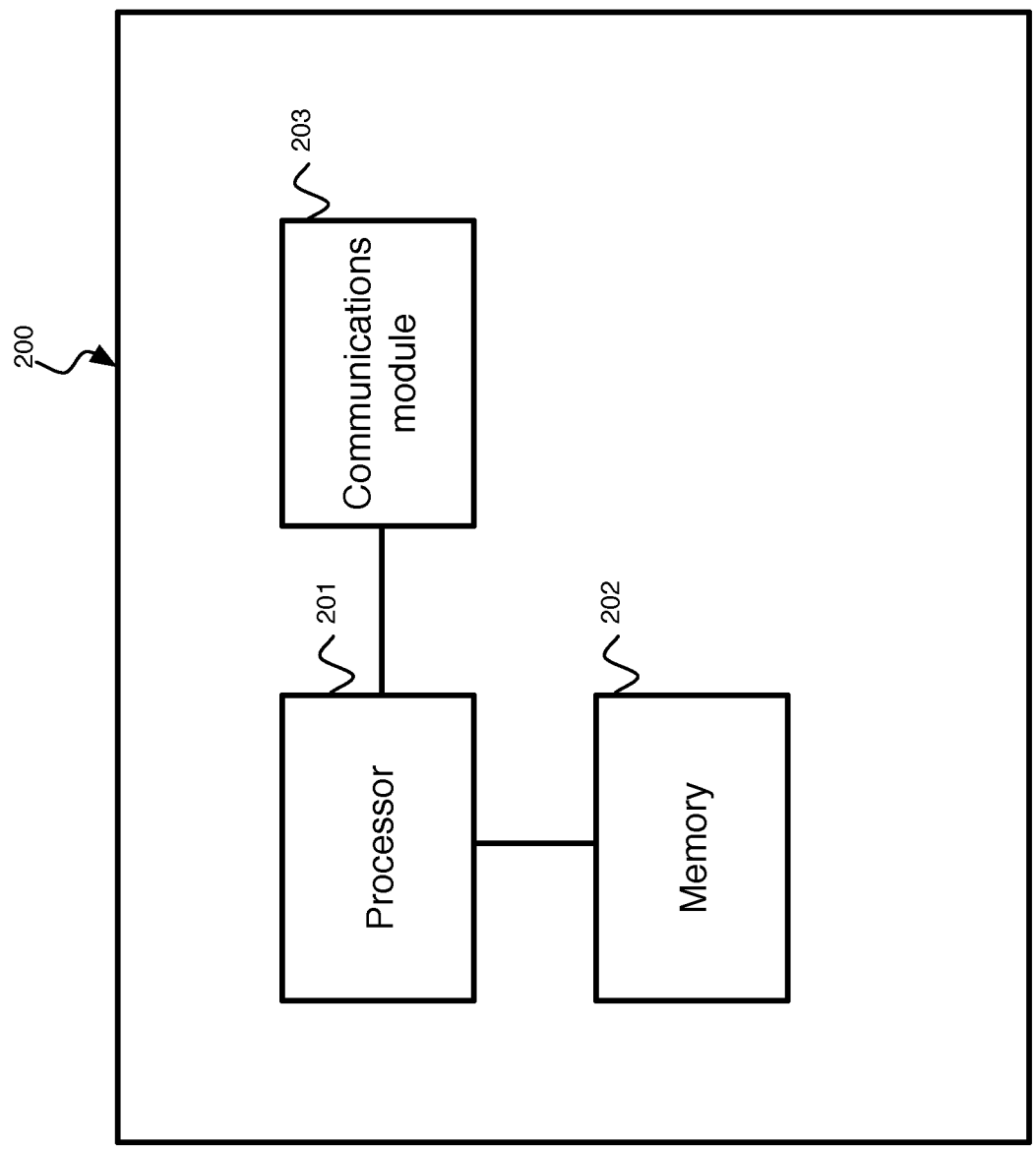
FIG. 2: shows a block diagram illustrating a node in accordance with an embodiment of the invention.

In FIG. 2, one 200 of the plurality of nodes 101 in accordance with an embodiment of the invention is shown.

The node 200 includes a processor 201, such as a CPU, a memory 202 and a communications module 203.

The memory 202 may be configured for storing computer instructions, which, when executed on the node, perform the methods described in relation to FIGS. 6 to 9.

It will be appreciated that the node 200 may include more than one processor 201.

Figure 3:
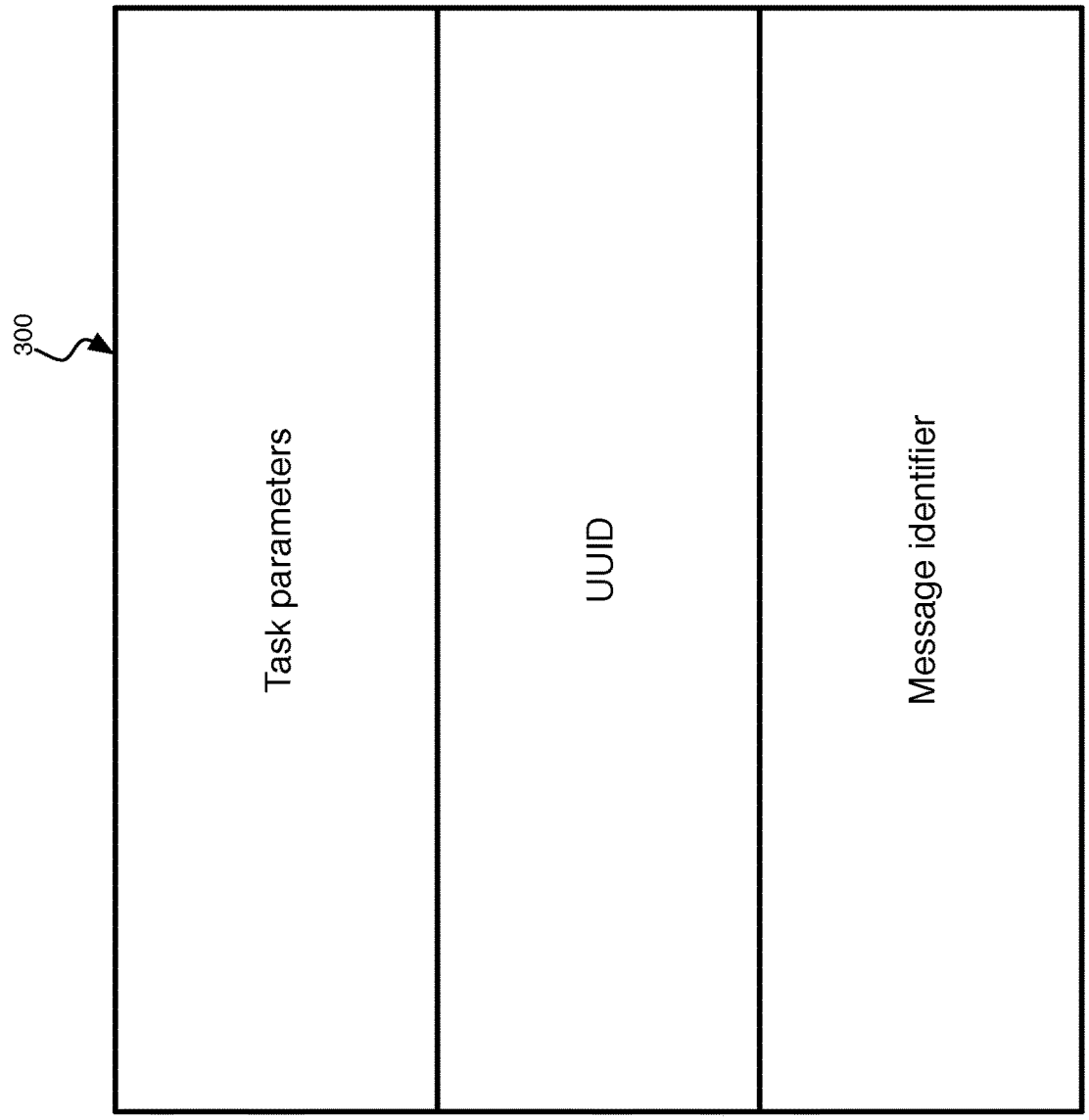
FIG. 3: shows a block diagram illustrating a job structure in accordance with an embodiment of the invention.

In FIG. 3, the structure of a job 300 is shown.

Each job may include parameters which define the tasks to be performed, a UUID (universally unique identifier), and a messaging identifier for the persistent messaging channel.

Figure 4A:
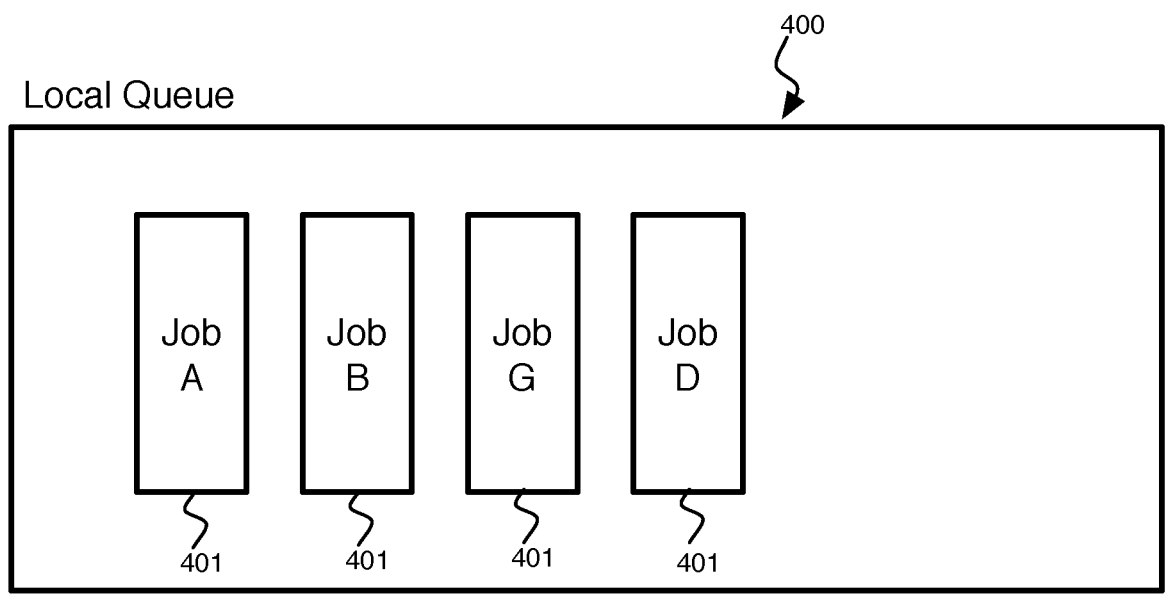
FIG. 4a: shows a block diagram illustrating a local queue in accordance with an embodiment of the invention.

In FIG. 4a, a local queue 400 is shown.

Each node 101 may be configured to access their own local queue 400. The local queue 400 may be stored within the memory 202 at each node 101.

The local queue 400 may be configured to store serialised versions of the jobs 401.

Figure 4B:
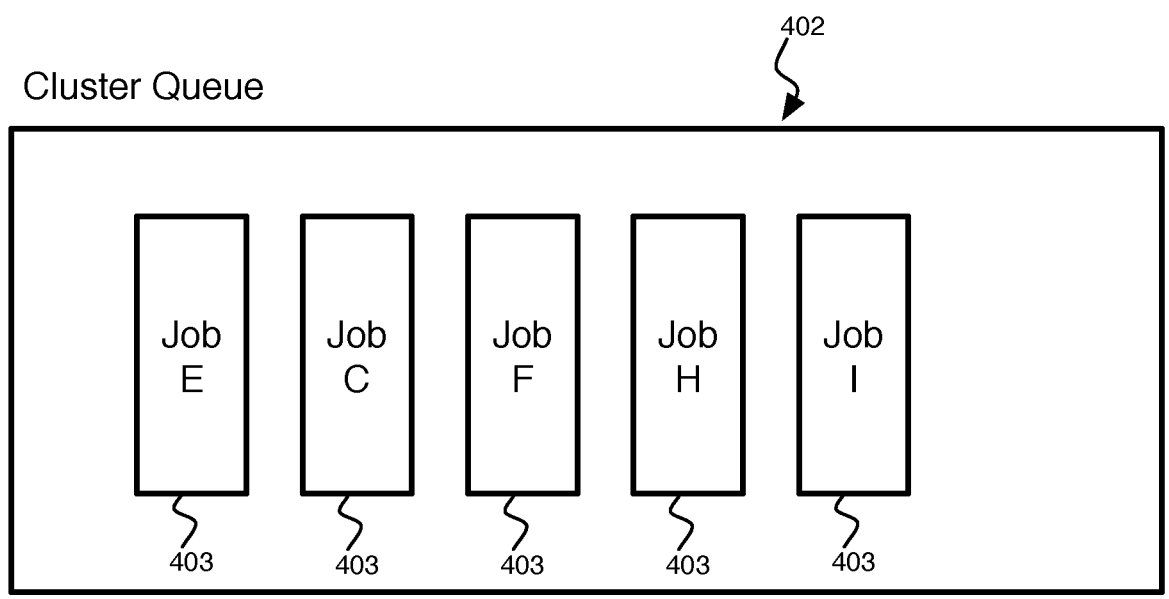
FIG. 4b: shows a block diagram illustrating a cluster queue in accordance with an embodiment of the invention.

In FIG. 4b, a cluster queue 402 is shown.

The cluster queue 402 may be replicated or accessible across the plurality of the nodes 101.

The cluster queue 402 is configured to store serialised versions of the jobs 403.

In FIG. 5a, a job map 500 is shown.

The job map 500 comprises a plurality of entries 501 mapping parent jobs 502 to children jobs 503.

The job map 500 is a cluster data structure and the entries are replicated or accessible across the plurality of the nodes 101.

In FIG. 5b, a message registry 504 is shown.

The message registry 504 comprises a plurality of messages 505 generated during processing of jobs mapped to messaging identifiers 506.

The message register 504 may be cluster data structure such that it is replicated or accessible across the plurality of the nodes 101.

Figure 6:
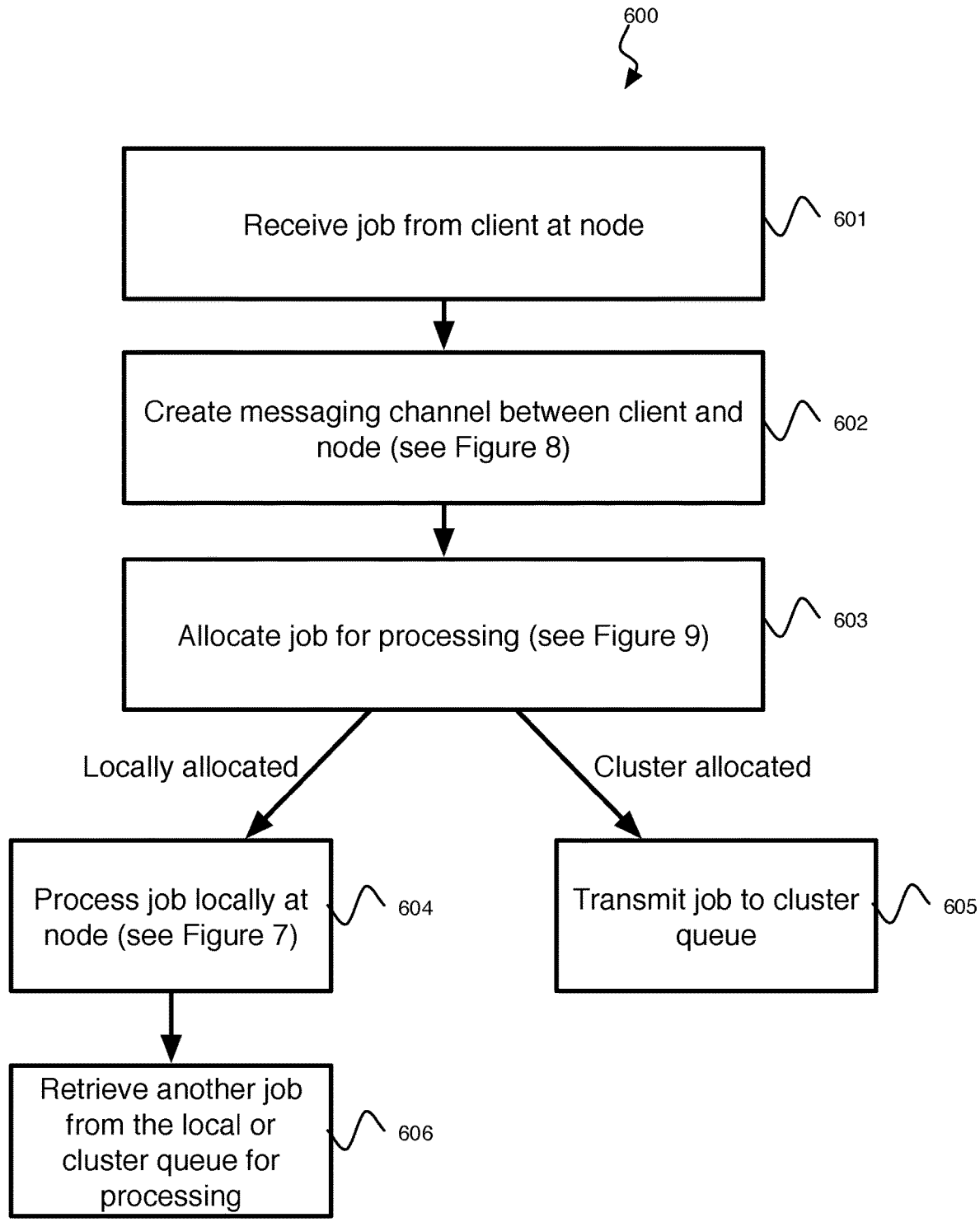
FIG. 6: shows a flow diagram illustrating a method in accordance with an embodiment of the invention.

With reference to FIG. 6, a method in accordance with an embodiment of the invention will be described.

In step 601, a job is received for processing at a node from a client.

In step 602, a messaging channel may be created for the job. The messaging channel may be constructed in accordance with the method described in relation to FIG. 8.

In step 603, the job is allocated to be either processed locally at the node in step 604 or enqueued to a cluster queue in step 605. The job may be allocated in accordance with an allocation method, for example, as described in relation to FIG. 9.

In step 604, the job is processed locally at the node, for example, by one of the workers or threads at the node. The job may be processed in accordance with the method described in relation to FIG. 7.

In step 605, another job may be retrieved from the local queue or the cluster queue (if the local queue is empty for example) for processing.

Figure 7:
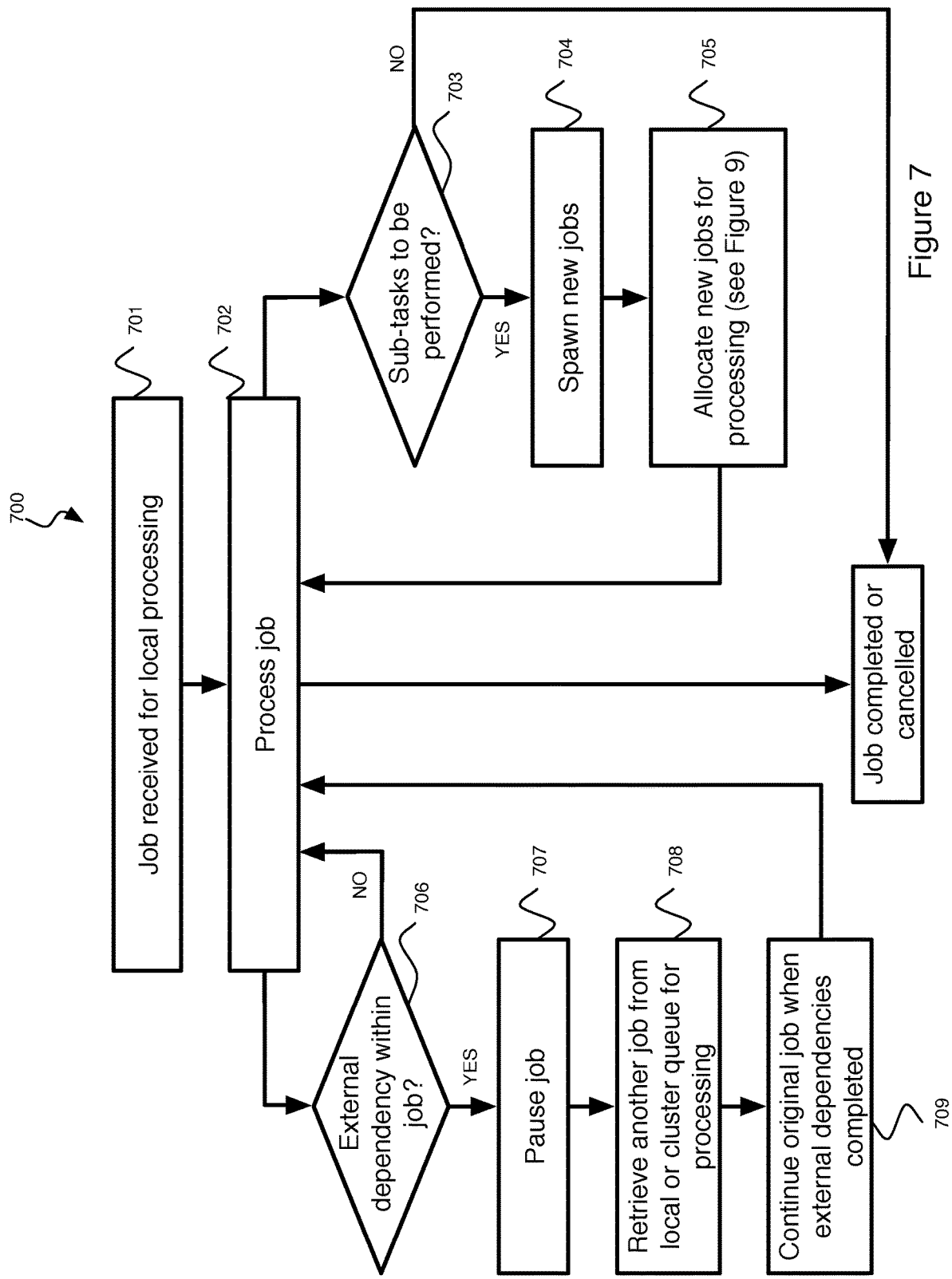
FIG. 7: shows a flow diagram illustrating a job processing method in accordance with an embodiment of the invention.

With reference to FIG. 7, a job processing method in accordance with an embodiment of the invention will be described.

In step 701, the job is received for local processing at step 702 at the node.

In steps 703 and 704, new jobs (child jobs) may be spawned to perform sub-tasks within the job definition. An entry may be created in the job map mapping the original job to the child jobs. The new jobs may be flagged for local execution (for example, if the require state of execution is too large to serialise and distributed around the cluster).

Figure 9:
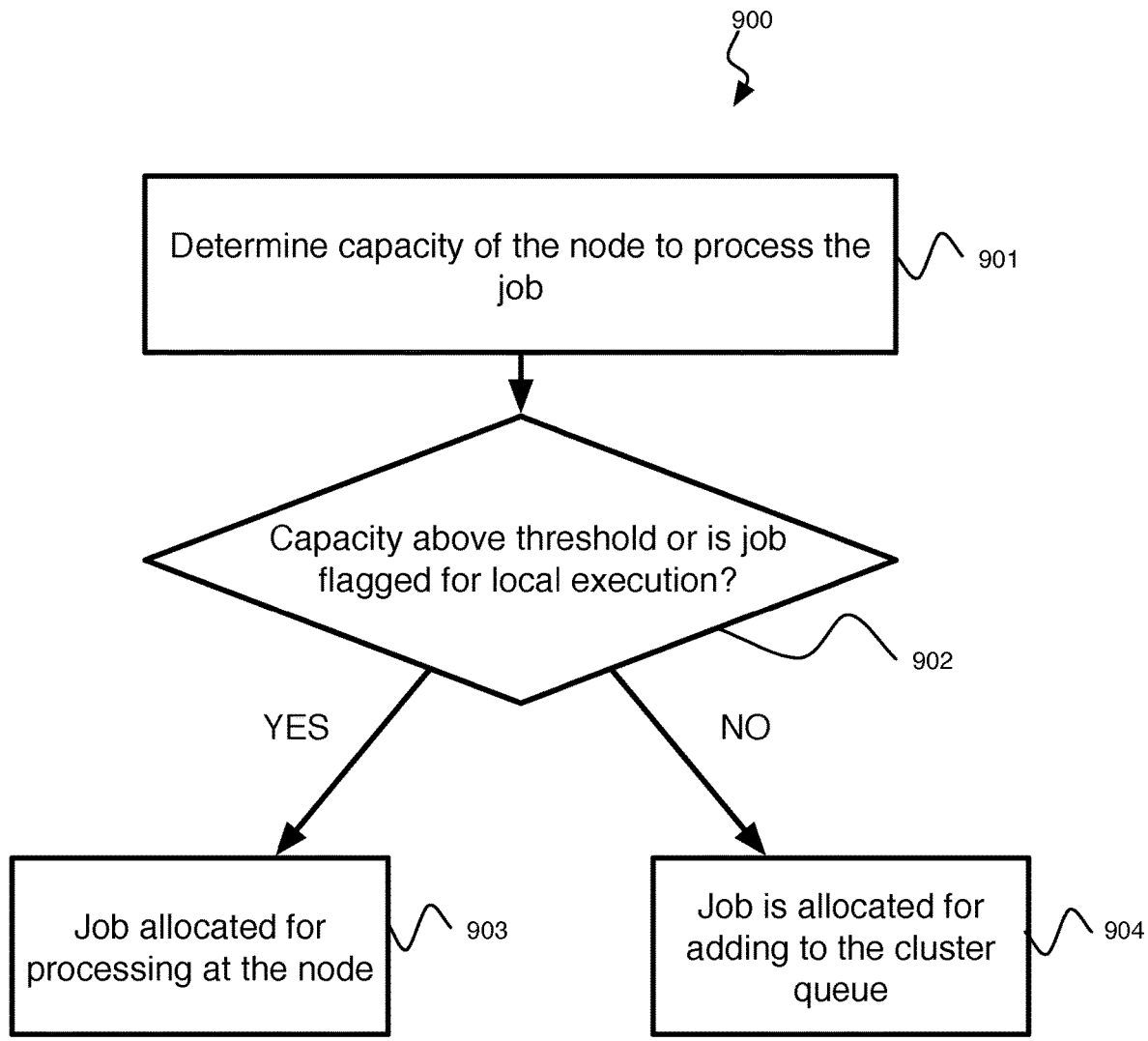
FIG. 9: shows a flow diagram illustrating a job allocation method in accordance with an embodiment of the invention.
Figure 10:
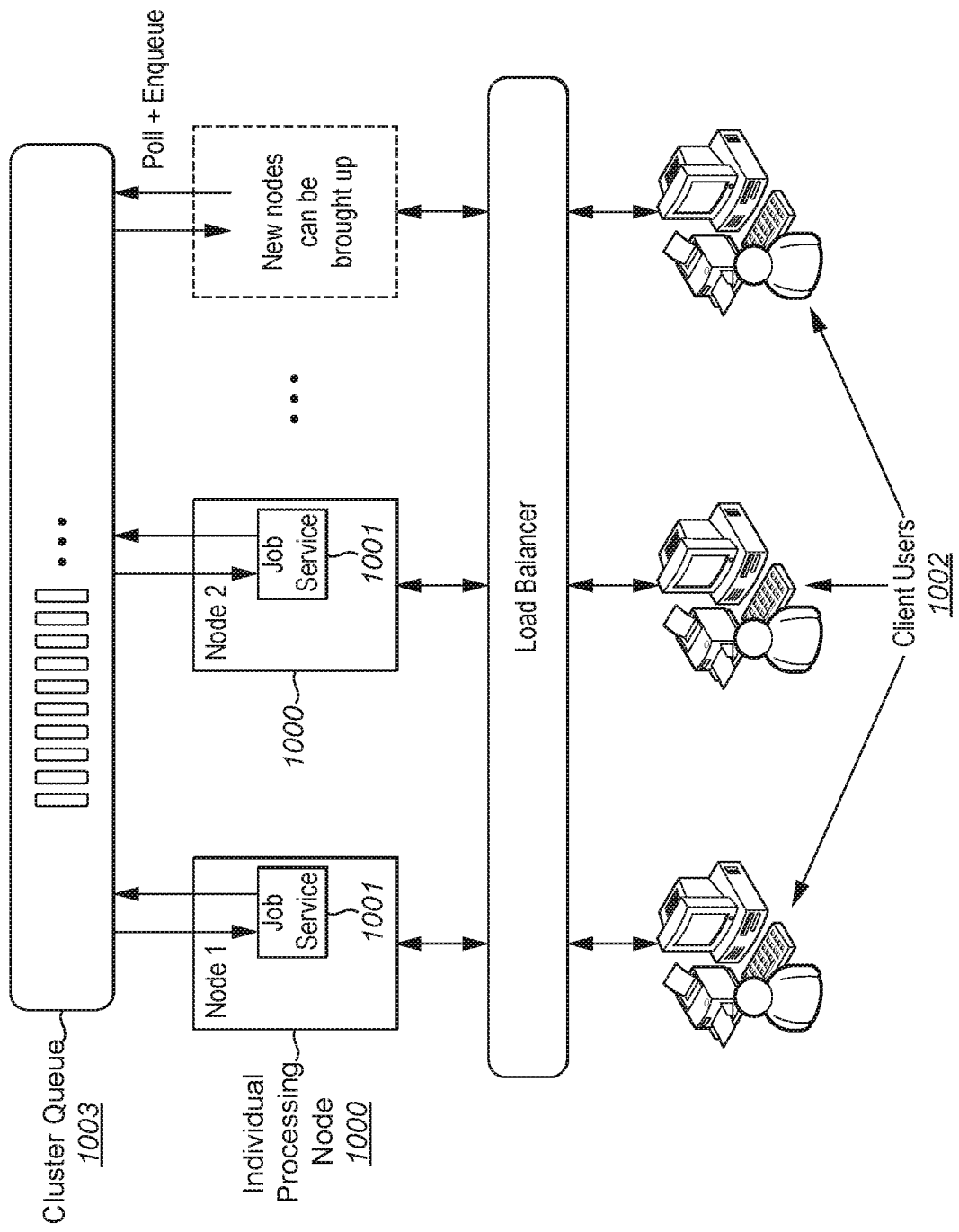
FIG. 10: shows a block diagram illustrating a system in accordance with an embodiment of the invention.

In step 705, the new jobs may be allocated for processing, for example, by the method described in relation to FIG. 9.

In step 706, the original job is processed until external dependencies are detected.

In step 707, when external dependencies are detected the original job is paused.

In step 708, another job is retrieved from the local queue or the cluster queue and processed.

In step 709, the processing of the original job continues when the external dependencies are completed. Completion of the external dependencies may trigger queuing of the original job on the local queue, such that processing of the original job will continue when the node retrieves the job from the queue.

During processing of a job, the job may elect to cancel itself (for example, if it is taking longer than a defined time to complete its tasks). The job map can be used by the nodes to ensure that all child jobs are also cancelled.

The client may also send a message (for example, via the messaging channel) to cancel the original job. The job map can be used by the nodes to cancel all child jobs.

Figure 8:
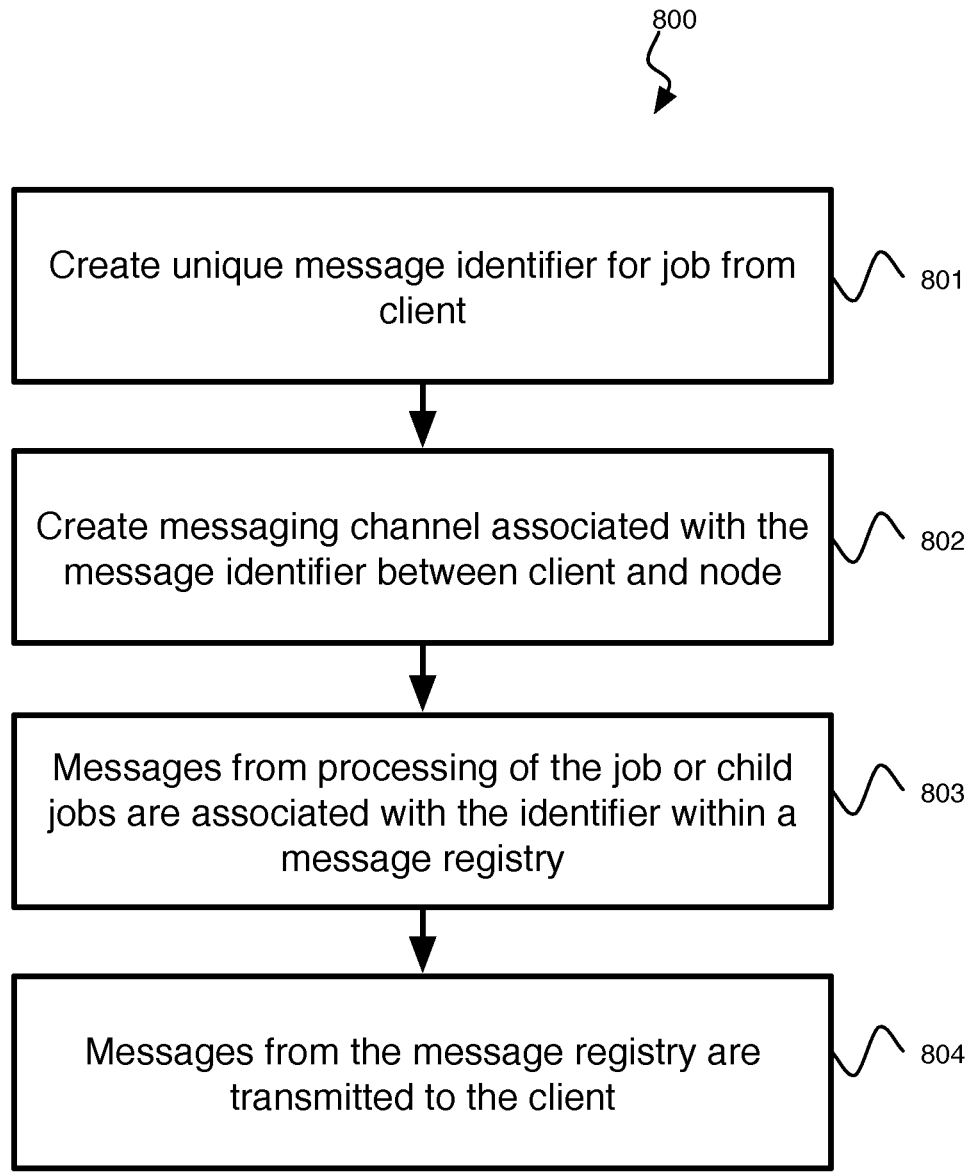
FIG. 8: shows a flow diagram illustrating a messaging method in accordance with an embodiment of the invention.

With reference to FIG. 8, a messaging method 800 in accordance with an embodiment of the invention will be described.

In step 801, a unique messaging identifier for the job is created.

In step 802, a messaging channel associated with the identifier is created between the node and the client.

In step 803, messages from processing of the original job or children jobs are associated with this messaging identifier and stored in the message registry.

In step 804, the messages from the message registry are transmitted to the client.

Messages may be transmitted by the node to the client, such that messages from across the cluster are forwarded by the node to the client. In one embodiment, if the client disconnects from the node and reconnects to the cluster via a different node, a new messaging channel is created and associated with the original identifier to ensure messages for the original and/or child jobs are forwarded to the client.

With reference to FIG. 9, a job allocation method 900 at a node in accordance with an embodiment of the invention will be described.

In step 901, the capacity of the node is determined.

In step 902, if the capacity is above a threshold, the job is allocated for processing at the node at step 903. The job may also be allocated for processing at the node if it has been flagged for local execution.

In step 904, if the capacity is below a threshold, the job is to be enqueued to the cluster queue.

The capacity of the node may be the current CPU utilisation. In some embodiments, the capacity and/or threshold may be calculated based on the size of the cluster, an estimated memory and/or CPU cost to the job, and scaling limits.

In one embodiment, the node adaptively increases the numbers of workers/threads to process jobs and/or the rate at which jobs are dequeued from the cluster queue based upon statistics relating to the capacity of the node (such as projected load over time of processing jobs or current utilisation of the node.

With reference to FIGS. 10 to 17*b*, an embodiment of the invention will be described.

This embodiment provides a homogeneous cluster of networked server nodes 1000 all executing the job management system 1001 (JobFactory), and all of the platform services needed to perform the jobs. Each job has a definition and that definition is processed the same at each node 1000. Therefore, any node 1000 can either accept jobs from a client 1002, and process a job directly or process jobs received by other nodes 1000.

A client 1002 with a job to perform can therefore communicate with any node 1000. The client 1002 begins communication by creating a single persistent messaging channel to a server node 1000, and this is used by the server node 1000 to return metadata about the job as well as results to the client 1002 whilst the client 1002 can initiate or cancel job requests. This messaging system is described in more detail in relation to FIG. 15.

The receiving server node 1000 accepts the job requests and will either start processing the job or push the job into a clustered queue 1003 for processing by another node 1000. The method for choosing whether to process locally or push to the cluster queue 1003 may be based on that node's current and/or projected CPU load. The method for determining capacity for job processing is described in more detail in relation to FIGS. 17*a* to 17*b*.

Figure 13:
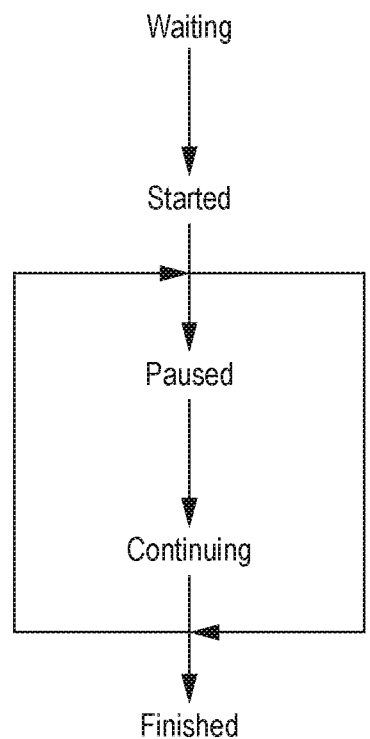
FIG. 13: shows a flow diagram illustrating a job lifecycle in accordance with an embodiment of the invention.

Processing of the job, once started, will continue until a subtask within the job cannot be completed until some external dependencies have completed. In this instance, the job will be paused, leaving the node 1000 free to process other jobs. When the external dependency is ready to be completed, the job is resumed (the state CONTINUING as shown in FIG. 13).

A job may require further tasks to be performed, and therefore, if applicable to the job definition, new jobs may be spawned, the status and result messages of which will be sent through the persistent messaging channel. This spawning of jobs may permit the complete task to be broken down and the client 1002 to receive results streamed back sooner than the overall job takes to complete. The continuation process and new job spawning process is described in more detailed in relation to FIGS. 11 to 14.

Further detail about the above embodiment will now be described:

Jobs

Jobs are tasks to be performed by the job management system 1001 for the client 1002, for example a job might be a query to an external web site (i.e. a web page) and for data to be extracted from it (a QueryJob). The QueryJob may involve a series of steps:

1. Using a local playback service to fetch the page within the query;
2. Using an extraction service to get data from the page;
3. Optionally spawning more QueryJobs for more pages if requested by client; and
4. Streaming messages back to the client 1002 on job status and results.

In this example, fetching a page such that data can be extracted also involves progressively evaluating the DOM (Document Object Model) and script references, within the page, to fetch associated resources, for example, JavaScript files, and executing them, before any data can be extracted from the page.

A job can therefore be seen as a series of tasks to be performed for the client 1002 that are fulfilled by utilising server-side service components.

When the job is submitted to the node 1000 it is serialised into a job definition, this job definition contains the task parameters, a messaging reference ID, and the type of job definition. When a job is received by the processing node 1000, this serialised job definition is de-serialised by a JobFactory 1001, and reconstituted with references to local services to perform the task. This serialisation of the job definition allows the implementation of the workers to be generic, i.e.:—one system may have multiple job definitions, for example, a QueryJob and PublishingJob.

Local Services and Job Continuations

A job uses local services to complete its necessary subtasks, these tasks by their nature may not be possible to be completed immediately, and a mechanism is needed so the service can pause the current job and allow other jobs to be processed.

Figure 11:
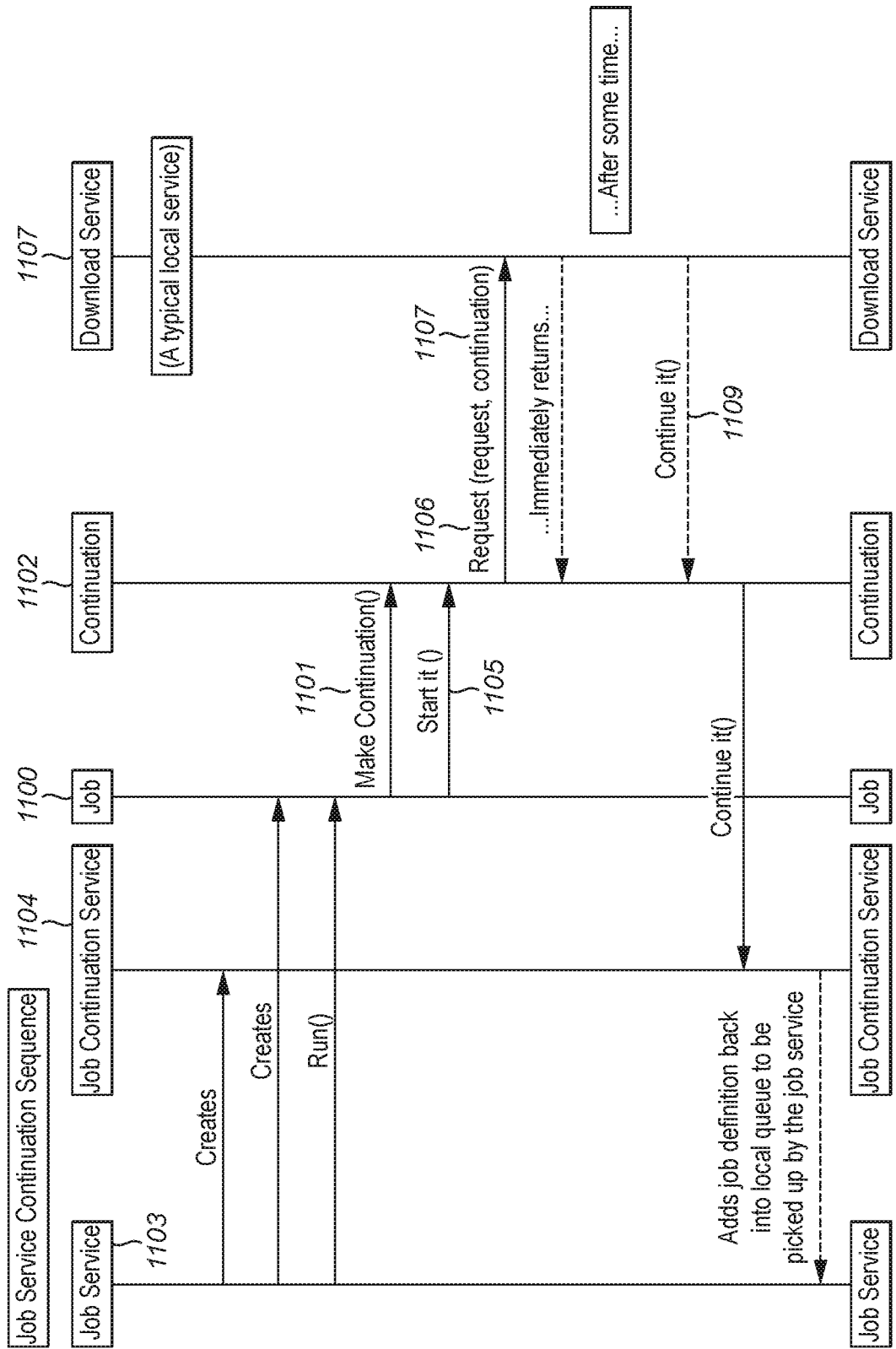
FIG. 11: shows a sequence diagram illustrating a job continuation method in accordance with an embodiment of the invention.

This is handled by the concept of continuations. A continuation mechanism allows for the task to be paused, and its state kept and resumed when the service is able to continue as shown in FIG. 11.

The job 1100 upon starting will create 1101 a new continuation 1102 from a JobFactory 1103, which has also created a ContinuationService 1104; the job will start 1105 the continuation 1102 and this will interact 1106 with services 1107 passing 1108 the ContinuationService 1104; and the service 1107, when it is has completed its task, can then use the ContinuationService 1104 to continue 1109 the continuation 1102.

The resolution of local services is implemented through the Java technology of OSGi (Open Service Gateway initiative), and the binding of the services to the jobs is done through the JobFactory.

JobService for Job Orchestration

Figure 12:
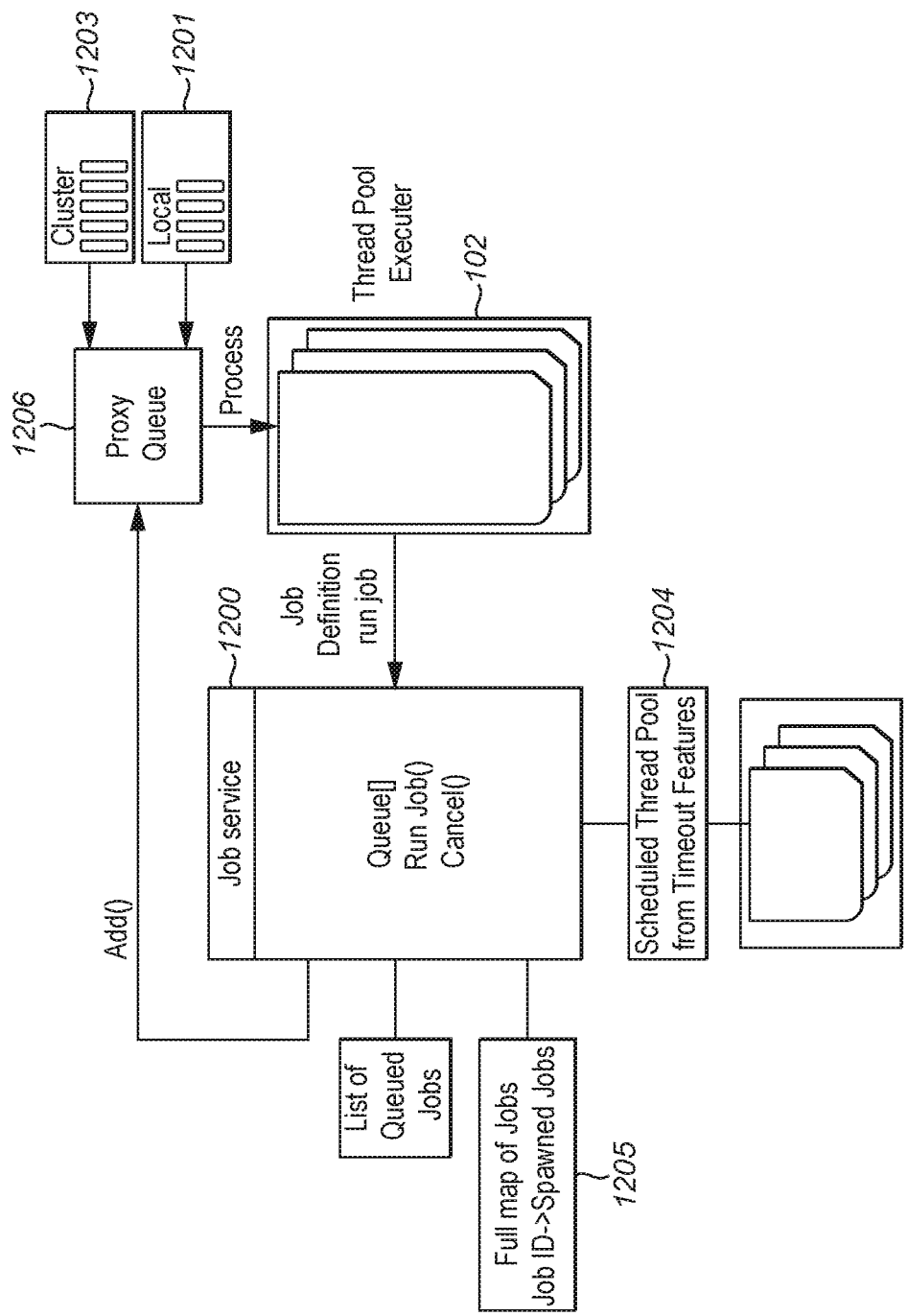
FIG. 12: shows a block diagram illustrating a job service in accordance with an embodiment of the invention.

As shown in FIG. 12, a JobService 1200 is a controller orchestrating jobs and there may be one or more instances of a JobService 1200 running on each node. The JobService 1200 handles the running, balancing, and distribution of jobs. Each instance of the JobService 1200 may have different configuration for local job queues 1201, threadpool 1202 sizes, along with pluggable implementations for statistics generation. Statistics about a JobService 1200 can be used to drive automated scaling of nodes with the cluster, for example a count of the items in the cluster queue 1203, or an estimate of their CPU cost and time to complete, can determine whether new nodes need to be started.

JobService has the following function calls:

queue( )

Jobs are queued for execution using the JobService 1200, this includes the steps of:
  Deciding if the job must be executed locally or can be executed by another node in the cluster.
  If locally, submitting the job UUID to a local queue 1201.
  If by another node, adding the job definition to a clustered queue 1203.
  Adding a timeout task to be executed, if the job time-outs before being taken off the queue, this is submitted to the ScheduledExecutorService 1204 to be run after a given time limit.
  Adding a multi-map 1205 of parent job spawned child jobs.

The decision to execute locally or in the cluster is decided by the following factors:
  Is there capacity locally? This is definable, and, for example, can be based on a rolling average of CPU utilization such that if the utilization is below a configured threshold the job can be processed locally.
  Is the job flagged for local execution?

If the job is to be executed locally a runnable object is submitted to the ProxyQueue 1206, the runnable contains an ID reference to the JobService 1200 and the JobDefinition. If the job is to be executed on the cluster then the JobDefinition is serialized and added to the cluster queue 1203, and when the JobDefinition is pulled from the queue 1203 on another cluster node, the JobDefinition is deserialized into a runnable object with a reference to that node's local JobService instance and the JobDefinition.

When a job is started, this is broadcast to the other cluster nodes and the job is removed from the queue 1203, if the job is not removed before the preconfigured time limit then the timeout task will execute removing the job and, using the messaging channel, notify the client that the job has timed out.

runJob( )

Each node on the platform has an instance of a ThreadPoolExecuter 1202, which has a fixed pool of executors that poll the ProxyQueue 1206 for new runnable tasks to be executed; by design, these runnables have a reference to the JobService 1200 and the JobDefinition. Each executor, therefore, can call JobService.runJob(JobDefinition).

cancelJob( )

The JobService 1200 keeps track of jobs and new spawned jobs in a cluster MultiMap 1205 that maps root job UUIDs to spawned job UUIDs. This means if a node receives a request to cancel a job, the job UUID is broadcast to all nodes along with all spawned child job UUIDs, interrupting and cancelling any of those jobs that are currently running.

Job Lifecycle

The lifecycle of a job is shown in FIG. 13.

Important status changes are from "STARTED" to "PAUSED" and "PAUSED" to "CONTINUING", this reflects that a job can be paused while local tasks wait for completion.

When a job is executed, the Job#startIt( ) method is called. Jobs must exit in either a FINISHED or PAUSED state (Job#getState( )).

If a job is cancelled it ends in a FINISHED state.
If a job is completed, it is by definition in a FINISHED state.
If a job is paused, it is waiting on network I/O or similar. It is up to another other thread to request that the job is continued via the JobContinuationService that is set by Job#setJobContinuationService( ) upon start of the Job by the Job Service. When it is continued, the Job#continueIt( ) method is called, and the process starts again.

Spawning

Figure 14:
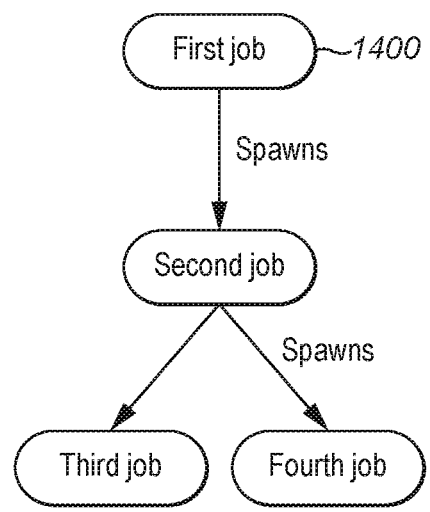
FIG. 14: shows a flow diagram illustrating a job spawning method in accordance with an embodiment of the invention.

To further split the jobs into smaller processing units, the job management system 1001 provides for jobs to spawn subsequent jobs to do related processing as shown in FIG. 14. An example of this are: paged requests where the first job returns the first page of data and spawns a request for the next page of data to be retrieved, or a "federated search" returning results for the different sites in answer to the one initial query job.

Spawned jobs can flagged to be executed locally, if the required state of execution is too large or expensive to serialize and distribute around the cluster of nodes.

A job that is not spawned is called a root job 1400.

Jobs are stateless with the spawned jobs not sharing state with the parent. However spawned jobs share the reference to the messaging channel and therefore clients receive messages about the state of the job and all spawned jobs, including the results.

When all jobs started are completed, the query can be considered complete.

Asynchronous Execution of a Job

By using the concept of continuations, execution of a job can be paused whilst completion of external operations are awaited. When external operations complete the jobs are resumed from the point of being paused.

This means that jobs are constantly pausing and un-pausing as external operations start and finish.

JobService tracks metrics for each job, for example CPU time, memory usage, total time, and makes these metrics available via the ContinuationService. Based on this a job can make decisions, for example, a query job could cancel itself if CPU execution time exceeds a defined limit.

Messaging

Figure 15:
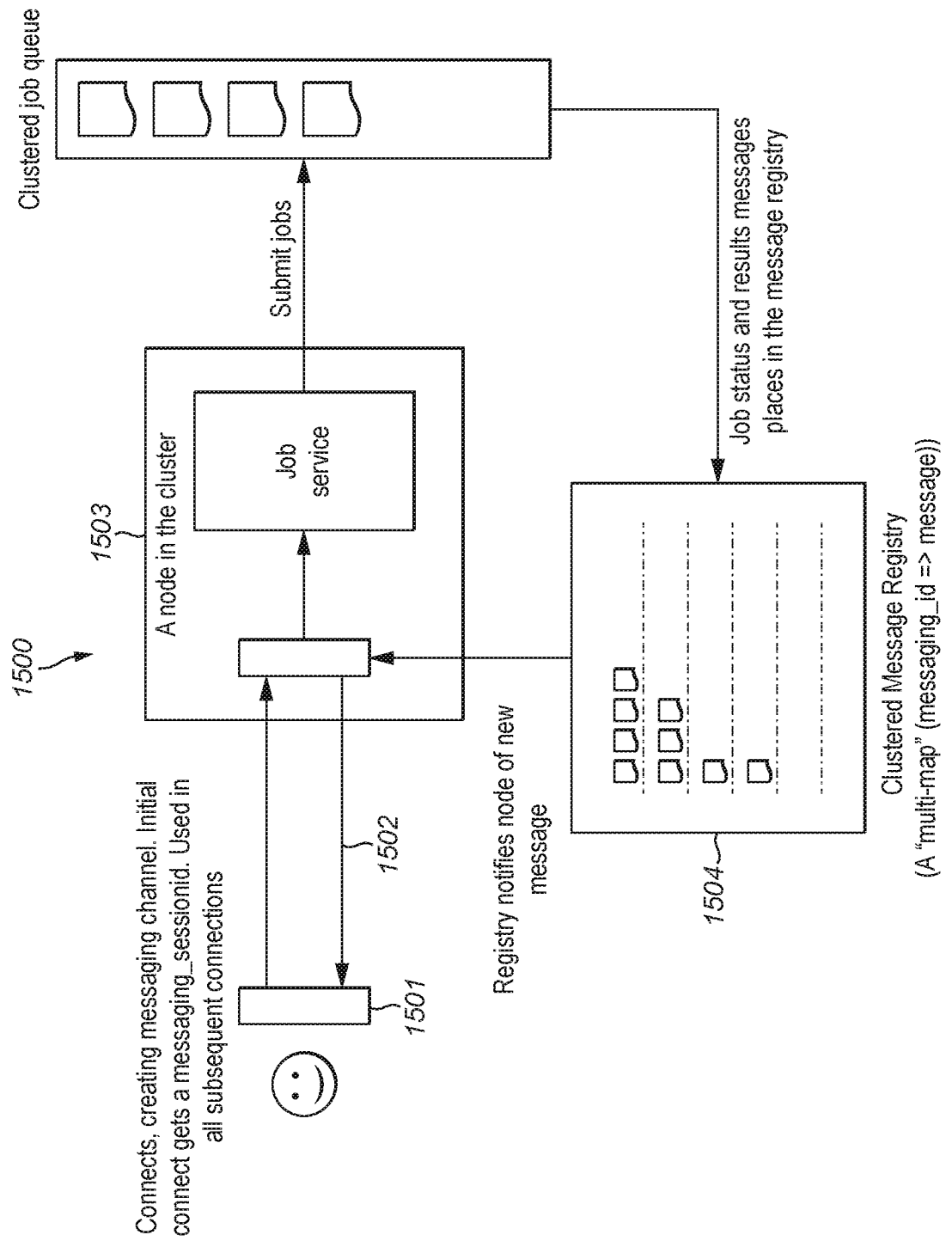
FIG. 15: shows a block diagram illustrating a messaging system in accordance with an embodiment of the invention.

As shown in FIG. 15, the messaging system 1500 provides a stream of messages back to the client 1501 on the status and result of the job and spawned jobs. A messaging channel 1502 is created from the client 1501 to a receiving node 1503 This channel 1502 receives all messages received from this node 1503 and any node that has processed jobs for this client 1501. A registry 1504 of collected clients is created in the cluster and shared to all nodes that process the job. Messages are then sent to the message registry 1504 and stored. Nodes 1503 that have the original connection are notified if a message is added for their connections.

This cluster data structure 1504 that provides a registry of message channels means that any node that processes jobs for another node 1503 can send messages back to the connected client 1501 at the other node 1503. This also means the client 1501 can disconnect and re-connect to another node in the cluster and receive any messages not yet sent. This enables load balancing, with jobs potentially being processed by other nodes and failover if the node holding the connection terminates.

When the connection is disrupted, it can be resumed when the client reconnects to any node if they present the messaging ID they were originally served when the initial connection was made. One implementation for providing messaging is using an implementation of Cometd so a client sends messages over an HTTP long-poll or websockets channel.

The list of message types are:

| | |
|---|---|
| INIT | Message when a new job has been received by the server from a client |
| MESSAGE | Message containing the results of the job execution |
| STOP | Metadata indicating a job has finished |
| ERROR | Message indicating an error processing a job |
| START | Message sent when the server has started processing a new job |
| SPAWN | Message sent when a job spawns another child job |
| CANCEL | Message sent when a job has been cancelled. |

A typical flow of messages can be seen as:

| Client | Server | |
|---|---|---|
| sends query job (query input "XYZ", max pages 2) | QueryJob => | |
| | <= INIT | Server sends an INIT message acknowledging the job ... job is queued ... |
| | <= START | Job is ready for processing, server sends a START message |
| | <= MESSAGE | Job results in data - one or more MESSAGE is sent containing the data |
| | <= SPAWN | The Job then SPAWNs zero or more jobs ... jobs are queued ... |
| | <= STOP | First job is finished, server sends STOP message |
| | <= START | Second job is ready for processing, server sends a START message |
| | <= MESSAGE | Second job results in query data, server sends a MESSAGE containing data. |
| | <= STOP | Second job is finished, server sends a STOP message ... this message conversation will continue for every job that is spawned, and each job can spawn new jobs ... |

Clustered Infrastructure

Figure 16:
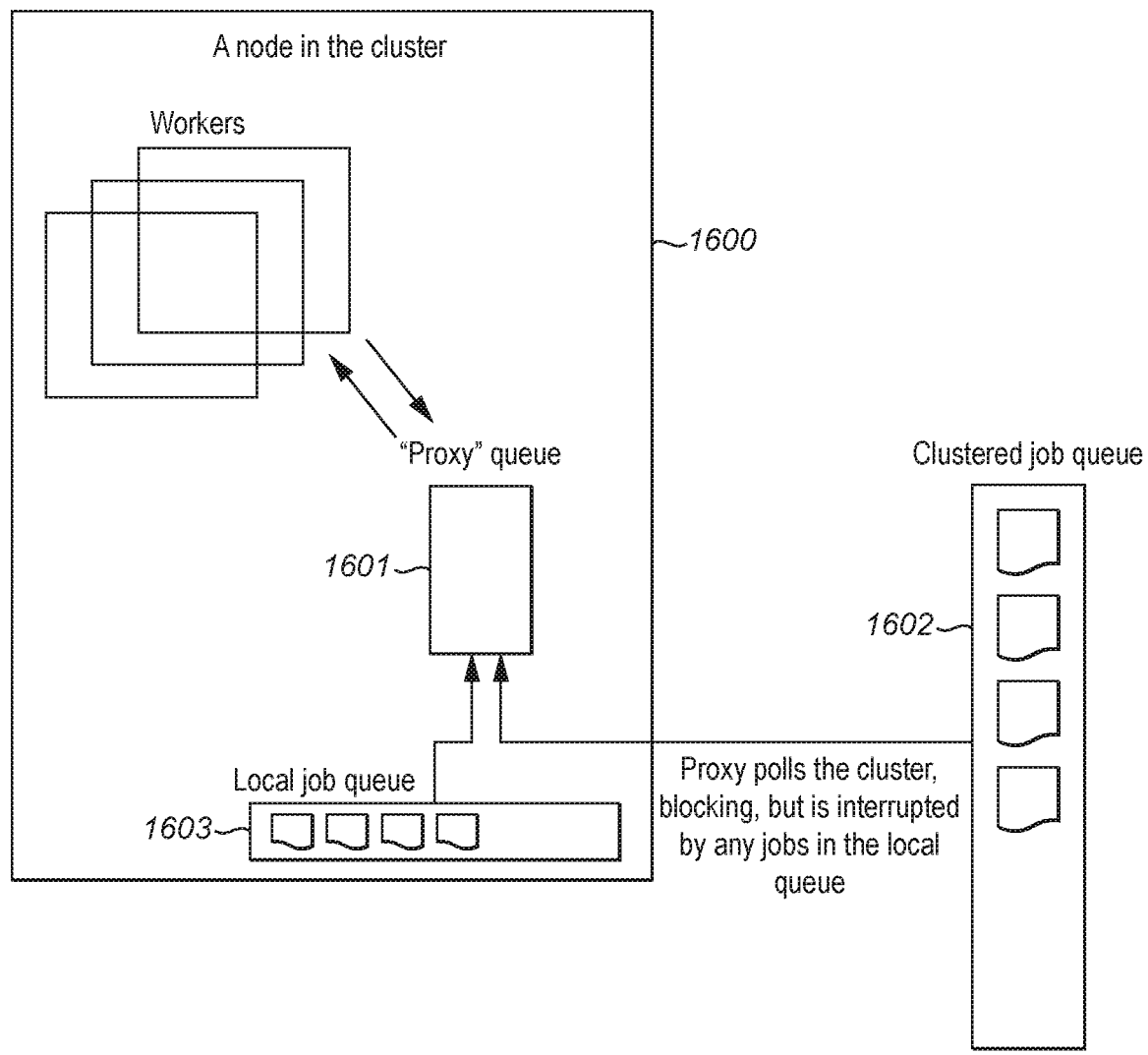
FIG. 16: shows a block diagram illustrating a job processing system in accordance with an embodiment of the invention.

As shown in FIG. 16, all nodes 1600 in the cluster are effectively the same, they can receive connections from clients submitting jobs to the queue and they can process jobs from the cluster if they have capacity.

Each node has a worker as its own proxy for the cluster queue: a proxy queue 1601. The proxy queue 1601 will block waiting for the jobs from the cluster queue 1602, this wait is interrupted if there exist any local jobs added to the local queue 1603.

The proxy queue 1601 is defined as:

Using two queues internally: local 1603 and cluster 1602;

poll( ) returns the local item if available, otherwise waits until there are resources available (e.g. below a CPU threshold) before calling the cluster queue 1602, blocking (if appropriate);

If an item arrives on the local queue 1603 while the proxy queue 1601 is waiting on the cluster queue 1602, the wait is interrupted and the item from the local queue 1603 is returned;

If resources are no longer available, blocking on the cluster queue 1602 is interrupted and wait;

Therefore, the local queue 1603 is always prioritised; and

Continuations are added only to the local queue 1603.

Therefore, nodes 1600 under high usage do not process jobs from the cluster. If the threshold is exceeded that node will only poll its local queue 1603 until a fixed period of time has passed. The configuration (CPU threshold, time settings) of the proxy queue 1601 is intrinsic to the definition of the JobService implementation and behaviour. This configuration allows a node 1600 to not exhaust processing capacity such that it cannot process the jobs it currently has started.

Figure 17A:
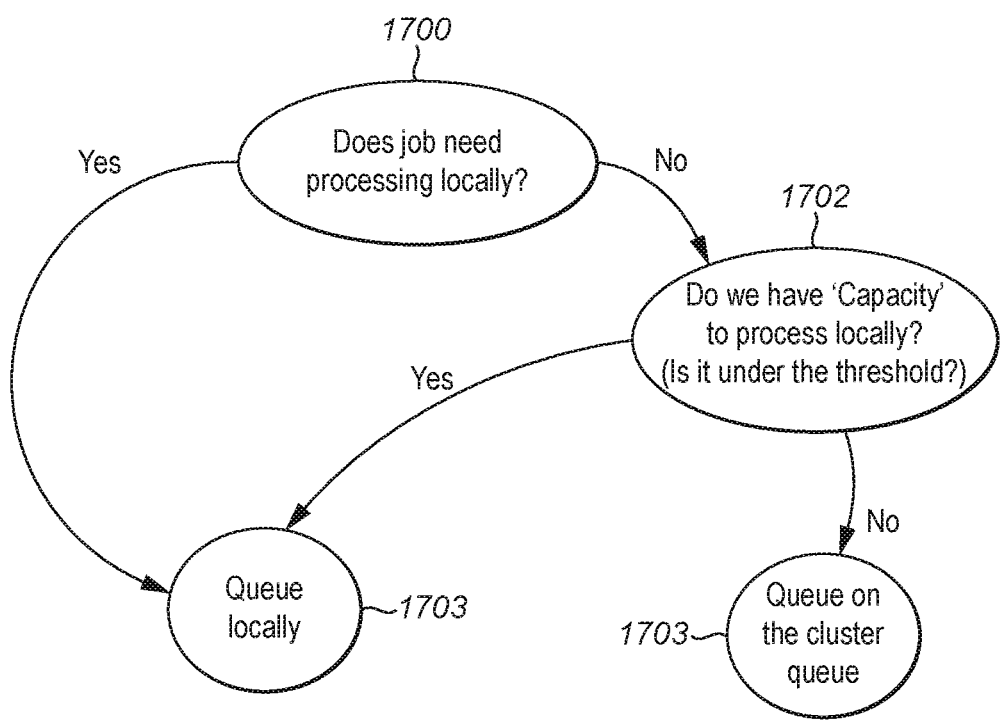
FIG. 17a: shows a flow diagram illustrating the first part of a job allocation method in accordance with an embodiment of the invention.

There are two processing decisions that need to be made:

1. Does the node have capacity to process the job locally, or should the job be pushed to the cluster queue? FIG. 17a illustrates how the decision is made under a threshold management mechanism. Firstly, does the job need processing locally in step 1700? If yes, then it is added to the local queue at 1701; if no, then a determination needs to be made if there is capacity to process the job locally in step 1702. If there is capacity, the job is added to the local queue at 1701 and, if no, the job is added to the cluster queue at 1703.

Figure 17B:
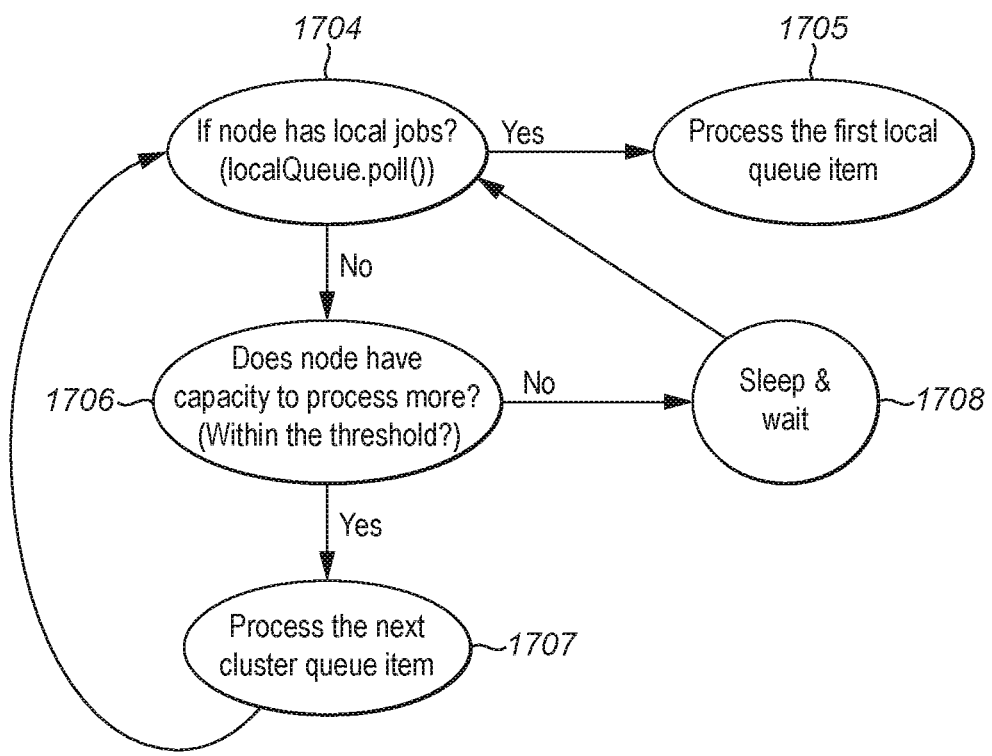
FIG. 17b: shows a flow diagram illustrating the second part of a job allocation method in accordance with an embodiment of the invention.

2. Does the node have capacity to process jobs from the cluster or should it only process local jobs? As shown in FIG. 17b, if the node has local jobs to process at 1704, then the first local queue item is processed in step 1705. If not, does the node have capacity to process more at 1706; if yes, then the next cluster queue item is processed in step 1707 and, if no, then sleep and wait at 1708.

These processing decisions can be encapsulated in a pluggable Processing Decider with one implementation, as above, based on the CPU utilization of the local node. More sophisticated implementations may be aware of the cluster size, estimated existing job cost in memory and/or CPU, and scaling limits before deciding whether to push or process the job locally.

In one embodiment, the pluggable Processing Decider can adapt the size of the local thread pool and/or the rate of dequeuing jobs from the cluster queue based upon statistics relating to, for example, the projected load over time of the running jobs, or the current utilization of the node.

Potential advantages of some embodiments of the present invention are listed in the table below:

| Embodiment feature | Potential advantages |
| --- | --- |
| Continuation concept compared to SEDA algorithm | Regarding SEDA, jobs that do not have a deterministic path would require continually passing between stages, potentially with multiple returns to the same stage. Consider rendering of a web page might require many calls to the download stage as new JavaScript scripts are evaluated. Some embodiments of the present invention reduce the number of calls required. By using the concept of continuation, there is no need for separate stages. |
| Keeping the job states within the program stack | Regarding SEDA and jobs that require a lot of state, again consider a web page and the state of evaluated scripts and the page DOM, would be problematic when serializing to the event queue. Some embodiments of the present invention avoid this problem by keeping the states within the program stack. |
| Homogeneous network by configuration of each node provides clustered processing nodes | Simple Infrastructure of some embodiments of the present invention (all nodes are the same) makes it easier-to-scale compared to the existing technologies. |
| Distributed processing of potentially long running jobs | Some embodiments of the present invention result in fair distribution of the resources leading to greater efficiency and better fairness in terms of job delays for different clients and service users. |
| Any node can receive jobs processing them locally or pushing to the server for execution | Better availability of resources leading to more efficient load balancing and better delay profile. |
| Jobs are serialised to a "job definition" which is added to the processing queue | This means that any node can process without the context of the original user request leading to better utilization of nodes. |
| Distributed processing is supported by cluster data structures | This provides the possibility of processing outside the constraints of one node. |
| Pause/run jobs while waiting for external dependencies | Providing for processing of other jobs whilst waiting results in improved delay profile, improved load balancing and improved scheduling of services. |
| Streaming of message results | This allows clients to receive information partially as it is being extracted (this means more user convenience and better user experience) as user does not need to wait for all the results until seeing a result. |
| Jobs spawning jobs (tree of jobs) | Splitting of a larger job into small jobs is reminiscent of using "map-reduce" to solve the problem. This spawning of jobs enables the complete task to be broken down and the client to receive results streamed back sooner than the overall job takes to complete. Reduced calls from users, reduce context and caching for the service provider on the next job, i.e. saving time and resources on the service providers' servers. |
| Cancelling of jobs | Cancelling because clients disconnected would save service providers' resources. |
| JobService control unit at each node for job orchestration and its related messaging flow | Results in better load balancing for the jobs in hand, providing better orchestration and creating harmony between the tasks leading to improved user experience and improved processing resource management on the service provider's server side. |
| A "pluggable processing decider" to decide whether the node have capacity to process the job locally, or should the job be pushed to the cluster queue? Also to decide whether the node have capacity to process jobs from the cluster or | Results in better load balancing for the jobs in hand, providing better orchestration and creating harmony between the tasks leading to improved user experience and improved processing resource management on the service provider's server side. |

| Embodiment feature | Potential advantages |
| --- | --- |
| should it only process local jobs? | |
| Utilising the continuation concept and the messaging flow, where execution of a job can be paused whilst they await external operations to complete. When external operations complete the jobs are resumed from that point. | Better utilization of the processing power, better user experience under large concurrent tasks. |
| A novel "configurable CPU threshold" which is checked and jobs are only pulled from the queue, if the threshold is met. If the CPU threshold is exceeded that node will only poll its local queue until a fixed period of time has passed. | Nodes that under high usage pressure do not process jobs from the cluster. This would lead to a better utilization of the processing power and better user experience under large concurrent tasks. |

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for processing jobs in a cluster architecture including a cluster queue for providing jobs to a plurality of processing nodes, each node of the plurality of processing nodes including a local queue for providing jobs, the method including:
   one node of a plurality of processing nodes within the cluster architecture receiving a job;
   processing the job until the job is waiting for a dependency external to the cluster architecture to complete;
   when the job is waiting for the external dependency, pausing the job by the node;
   after pausing the job, retrieving another job from a local queue for the node if the local queue includes another job and from the cluster queue if the local queue does not include another job;
   processing the retrieved another job by the node; and
   when the external dependency is completed, allocating the paused job to the local queue for the node to continue the job;
   wherein the job is received from an external client and messages in relation to the job are delivered back to the external client via a persistent messaging channel;
   further comprising determining, by the node, whether to process the received job locally or to push the received job to the cluster queue based on a current and/or projected processing load of the node; and processing the job by the node based on determining to process the received job locally.

2. A method as claimed in claim 1, wherein each job is deserialised from a job definition.

3. A method as claimed in claim 2, wherein the job definition includes task parameters and definition type.

4. A method as claimed in claim 1, wherein continued jobs are allocated to the local queue for the node.

5. A method as claimed in claim 1, wherein, when a job is paused, its state is saved.

6. A method as claimed in claim 1, wherein the external dependency is network input/output.

7. A method as claimed in claim 1, wherein the external dependency is information requested from an external Internet service.

8. A method as claimed in claim 1, wherein the node receives another job from another node of the plurality of processing nodes.

9. A system comprising:
   a plurality of processing nodes within a cluster architecture including a cluster queue for providing jobs to the plurality of processing nodes, each node of the plurality of processing nodes including a local queue for providing jobs; and
   a communications system;
   wherein the system is configured to perform a method for processing jobs in the cluster architecture, the method comprising:
      one node of a plurality of processing nodes within the cluster architecture receiving a job;
      processing the job until the job is waiting for a dependency external to the cluster architecture to complete;
      when the job is waiting for the external dependency, pausing the job by the node;
      after pausing the job, retrieving another job from a local queue for the node if the local queue includes another job and from the cluster queue if the local queue does not include another job;
      processing the received another job by the node; and
      when the external dependency is completed, allocating the paused job to the local queue for the node to continue the job;
      wherein the job is received from an external client and messages in relation to the job are delivered back to the external client via a persistent messaging channel;
      further comprising determining, by the node, whether to process the received job locally or to push the received job to the cluster queue based on a current and/or projected processing load of the node; and processing the job by the node based on determining to process the received job locally.

10. A non-transitory computer readable storage medium having stored therein computer instructions which, when executed by a processor of a node of a plurality of processing nodes, cause the node to perform operations for processing jobs in a cluster architecture including a cluster queue for providing jobs to the plurality of processing nodes, each node of the plurality of processing nodes including a local queue for providing jobs, the operations comprising:
   one node of the plurality of processing nodes within the cluster architecture receiving a job;
   processing the job until the job is waiting for a dependency external to the cluster architecture to complete;
   when the job is waiting for the external dependency, pausing the job by the node;
   after pausing the job, retrieving another job from a local queue for the node if the local queue includes another job and from the cluster queue if the local queue does not include another job;
   processing the retrieved another job by the node; and when the external dependency is completed, allocating the paused job to the local queue for the node to continue the job;
wherein the job is received from an external client and messages in relation to the job are delivered back to the external client via a persistent messaging channel;
further comprising determining, by the node, whether to process the received job locally or to push the received job to the cluster queue based on a current and/or projected processing load of the node; and processing the job by the node based on determining to process the received job locally.

11. A method as claimed in claim 1, wherein the external dependency is non-deterministic.

12. A method as claimed in claim 1, wherein the messages include results and wherein at least some messages are delivered before the job is completed.

13. A method as claimed in claim 1, wherein the local queue is stored within memory at the one node.

14. A method as claimed in claim 1, wherein the local queue stores serialised versions of jobs.

15. The system of claim 9, wherein the external dependency is non-deterministic.

16. The system of claim 9, wherein the messages include results and wherein at least some messages are delivered before the job is completed.

17. The system of claim 9, wherein the local queue is stored within memory at the one node.

18. The system of claim 9, wherein the local queue stores serialised versions of jobs.

19. The non-transitory computer readable storage medium of claim 10, wherein the external dependency is non-deterministic.

* * * * *